No. 781,678. PATENTED FEB. 7, 1905.
C. H. RICHWOOD.
AIR COMPRESSING MACHINE.
APPLICATION FILED MAY 17, 1904.
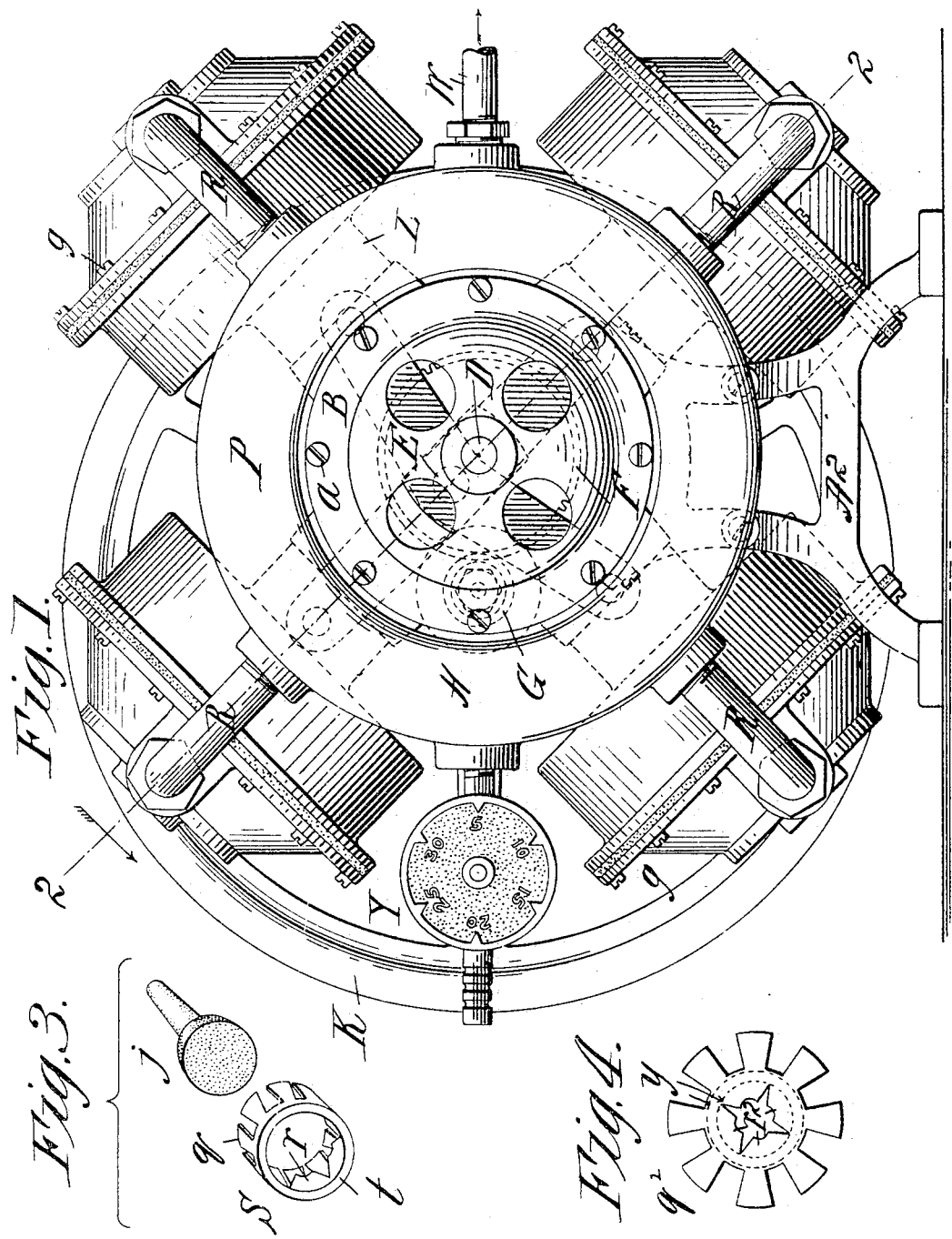

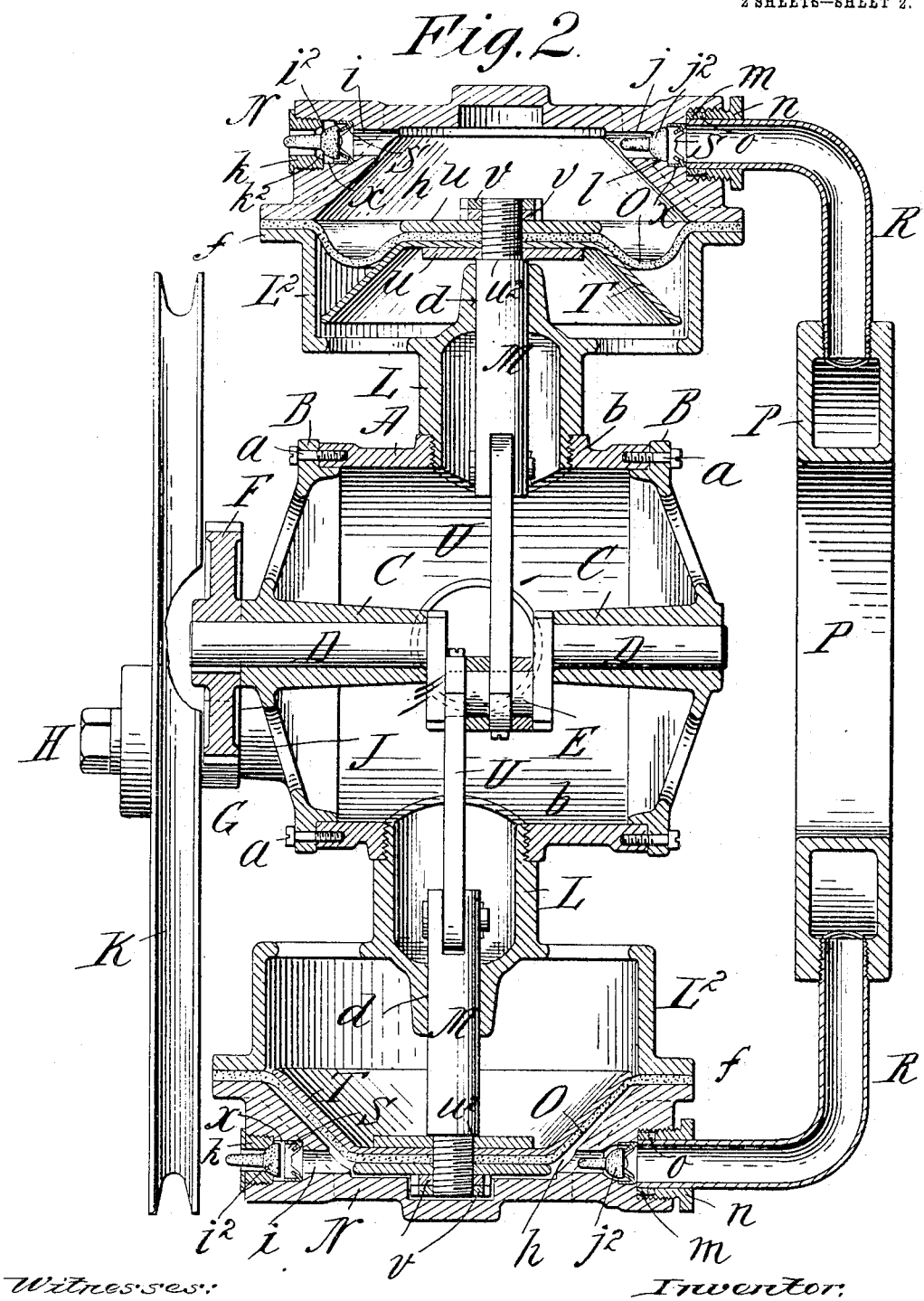

No. 781,678. Patented February 7, 1905.

UNITED STATES PATENT OFFICE.

CLARENCE H. RICHWOOD, OF BOSTON, MASSACHUSETTS.

AIR-COMPRESSING MACHINE.

SPECIFICATION forming part of Letters Patent No. 781,678, dated February 7, 1905.

Application filed May 17, 1904. Serial No. 208,439.

*To all whom it may concern:*

Be it known that I, CLARENCE H. RICHWOOD, a citizen of the United States of America, and a resident of Boston, in the county of Suffolk and State of Massachusetts, have invented certain new and useful Improvements in Air-Compressing Machines, of which the following is a full, clear, and exact description.

This invention relates to improvements in a machine or apparatus for compressing air.

The object of the invention is to produce a machine designed generally for compressing air to actuate small pneumatic machinery—such, for instance, as massage-vibrators—although the availability and capacity of the machine is not to be considered as limited; and it is the purpose to produce a machine of the character indicated which is of extreme simplicity in construction, capable of being produced at small expense, and capable of being run mechanically.

The invention consists in the combinations, arrangements, and constructions of parts, all as hereinafter fully described in conjunction with the accompanying drawings and set forth in the claims.

In the drawings, Figure 1 is a side elevation of the air-compressing machine. Fig. 2 is a sectional view through the complete machine as taken on the line 2 2, Fig. 1. Fig. 3 is a perspective view showing a valve and valve-limiting devices employed. Fig. 4 is a development of the metallic plate from which the valve-cage is made.

Similar characters of reference indicate corresponding parts in all of the views.

In the drawings, A represents a central hollow cylindrical body, shown as axially horizontal and for which supporting-uprights $A^2$ are provided. This body A has at its opposite ends circular sections B, which may advantageously be in the form of spider-frames and provided with elongated hubs C, arranged in opposition and in axial alinement, the sections being secured to the ends of the central body by the bolts $a$.

D represents a crank-shaft having the crank E thereof at its intermediate portion, the end portions being journaled in and through the aforesaid elongated axially-alined hubs C of the end sections B, one end of the shaft outwardly projecting, having thereon a spur gear-wheel F, with which meshes a pinion G, which is on a short stud or counter-shaft H, supported in an outwardly-extending boss J, formed as a part of one of the end sections, and on this stud-shaft is a driving-pulley K, to which power may be applied in any suitable manner.

The central body A has in different radial lines circular screw-threaded sockets or openings $b$, receiving therein the threaded extremities of preferably hollow sections L, extending axially in different radial lines and provided with elongated guide-holes $d$ for the rectilinear guidance of the diaphragm-rods M, and said sections L have widened cylindrical portions $L^2$, having the flanges $f$, which are connected, through the bolts $g$, with the casing-sections N and clamping between the inner faces of the said casing-sections and the flanges $f$ the marginal portions of the flexible diaphragms O. The flexible diaphragms constitute the inner walls of the diaphragm-chambers $h$, the outer walls of which are constituted by the casing-sections N, the chamber in each being flaring or of frusto-conical form, as shown, and $i$ represents air-inlet passages leading to the chambers $h$, and $j$ represents air-inlet passages leading from such chambers, $i^2$ and $j^2$ representing the valves for such passages.

P represents a reservoir or receiver for the compressed air, the same in the present instance being shown as of annular form and having its support at the front of the air-compressing apparatus through means of the connection of the annular conduits or pipe-sections R, which are screw-threaded each at one end into a threaded opening therefor in the receiver and which are coupled into the orifices of the outlet-passages of the compression-chambers $h$ $h$ of the several cases, the back wall of each of which is constituted by the flexible diaphragm O.

The outlet and inlet passages, as shown, are formed of two diameters, whereby the enlarged or chamber portions $x$ are produced for the accommodation of the enlarged or headed portions of the valves $i$ or $j$. The valve-seats of the air-inlet openings are constituted by the screw-plugs $k$, which have passages therethrough, with their inner ends flaring, as indicated at $k^2$, to constitute the valve-seats, into which the valves $i^2$ seat, the stems of the valves playing through the axial opening in the screw-plug. The valve-seat $l$ for each outlet is constituted by a flaring formation within the passaged casing-section N. The angular conduits R have flanges $m$ at their extremities, which may be constituted by small rings soldered on the ends of the pipes, and these ends being entered into the screw-threaded orifices of the outlet-passages of the diaphragm-casings are retained in place by the screw-plugs $n$, sections of compressible material $o$ being interposed between the inner ends of the screw-plugs and the flanged ends $m$ of the pipe-sections.

Fittings S are provided in the passage enlargements or chambers $x$, which serve for the guidance and also the limitation of the movements of the outlet-valves, the same being of skeleton or open-work construction and comprising a cage-like outer part $q$ and shorter abutment prongs or members $r$. These fittings are, as shown in Figs. 3 and 4, constituted each by a single blank of sheet metal of annular form and provided with outer separated prongs $q^2$ and inner separated prongs $r^2$, the blank being bent on the dotted lines $y$ so as to form a base or end bearing portion $t$ and one set of prongs concentrically within and of less length than the outer prongs, which latter conform substantially to the contour of a cylinder.

The diaphragms are connected to the outer ends of the diaphragm-rods M by being clamped between opposite plates $u$ $u$, through which the screw-threaded extremities of the diaphragm-rods pass, the plate at one side resting against a shoulder $u^2$ at the end portion of the diaphragm-rod, while the other end portion of the diaphragm-rod receives confining and check nuts $v$, and next to each diaphragm, at the back side thereof and between it and one of the clamping-disks $u$, is a rigid metallic shell T of flaring cup shape, conforming approximately to the flaring formation of the chamber within the casing-section N, so that when each diaphragm is forced outwardly the cup-shaped follower T carries and insures the movement of it and as to its whole area closely into the convergent chamber, whereby the air taken thereinto on the backward movement of the diaphragm will be expelled on the working movement to the last degree. The diaphragm-rods M, having the guidance for rectilinear movements through the straight bores therefor in the radial sections L, are at their inner ends pivotally connected to pitman-rods U, the several pitman-rods all converging to and having connection with the intermediate crank E of the power-driven crank-shaft D.

W represents an outlet or delivery conduit connected with and leading from the compressed-air receiver or reservoir P, and with the reservoir P may be connected, as shown at Y, a pressure-regulator, so that any given maximum of air compression as predetermined may be maintained in the reservoir, but which degree of compression by the action of the regulator will not be exceeded.

Power applied to the driving-pulley K, causing rotation of the crank-shaft D through the pitman-rods, imparts rectilinear reciprocatory movements to the diaphragm-rods M and diaphragms, the inward movement of each causing a suction of air into the respective compression-chamber $h$, while the outward movement compresses and expels the air into the receiver and all as manifest without extended description.

Having thus described my invention, what I claim, and desire to secure by Letters Patent, is—

1. In an air-compressing machine, in combination, a central body or support having a plurality of axially-radial casings therearound, having valved air-inlet, and valved air-outlet openings thereto and therefrom, a reservoir, and conduits connecting the same with the air-outlets, flexible diaphragms in said cases, and rods connected respectively thereto, having guide-bearings for rectilinear movements through bearings therefor which are supported by the central body, a driving-shaft having a crank mounted for rotation in the central body, pitman-rods severally connecting with the crank and with the respective diaphragm-rods, and means for rotating the said shaft.

2. In an air-compressing machine, in combination, a central body or support having a plurality of axially-radial casings therearound, each having its outer circular wall of flaring form, and having valved air-inlet and valved air-outlet openings thereinto and therefrom, a reservoir, and conduits connecting the same with the air-outlets, flexible diaphragms in said cases, and rods connected respectively thereto, having guide-bearings for rectilinear movements through bearings therefor which are supported by the central body, and carrying, next to the flexible diaphragms, rigid flaring diaphragm-followers, a driving-shaft, having a crank, mounted for rotation in the central body, pitman-rods severally connecting with the crank and with the respective diaphragm-rods, and means for rotating the said shaft.

3. In an air-compressing machine, in combination, a central hollow cylindrical body or support, having a plurality of radially-arranged sections therearound, screw-engaged therewith and having straight guide-bearings therethrough and supporting-casings having valved air-inlet and valved air-outlet openings at their outer portions, a reservoir and conduits connecting the same with the air-outlets, flexible diaphragms forming the back or inner walls of said cases, and rods connected respectively thereto and guided for rectilinear movements through said bearings, a shaft having a crank mounted for rotation in the central body, pitman-rods severally connecting with the crank, and with the respective diaphragm-rods, and means for rotating the said shaft.

4. In an air-compressing machine, in combination, a central hollow cylindrical supporting-body having at the opposite ends thereof circular sections provided with elongated hubs in alinement, and a shaft having an intermediate crank and having the end portions thereof journaled through said alined hubs, a plurality of sections having hollow cylindrical threaded inner portions, arranged in different radial lines about the body and screw-engaging in the body, having straight guide-bearings therethrough, and provided with widened circularly-flanged portions, diaphragm-cases bolted to said widened flanged portions and marginally-clamping flexible diaphragms therebetween, said casings having valved air inlet and outlet passages, a reservoir and conduits connecting the same with the several air-outlet passages, rods connected with the diaphragms and guided for rectilinear movements through said bearings, pitman-rods connecting the diaphragm-rods and the crank, and means for applying power to the crank-shaft.

5. In an air-compressing machine, in combination, a central hollow cylindrical supporting-body having at the opposite ends thereof circular sections provided with elongated hubs in alinement, and a shaft having an intermediate crank and having the end portions thereof journaled through said alined hubs, a plurality of sections having hollow cylindrical threaded inner portions, radially arranged and screw-engaging in the said central body, having straight guide-bearings therethrough, and provided with widened circularly-flanged portions, diaphragm-cases having flaring chambers therein bolted to said widened flanged portions and marginally-clamping flexible diaphragms therebetween, said casings having valved air-inlet and air-outlet passages, a reservoir and conduits connecting the same with the several air-outlet passages, rods connected with the diaphragms and guided for rectilinear movements through said straight guide-bearings, rigid metal flaring diaphragm-followers connected with the diaphragm-rods next to the diaphragms, pitman-rods connecting the diaphragm-rods and the crank, and means for applying power to the crank-shaft.

6. In an air-compressing machine, in combination, a central hollow cylindrical supporting-body having at the opposite ends thereof circular sections provided with elongated hubs in alinement, and having supporting-uprights therefor, a shaft having an intermediate crank and having the end portions thereof journaled through said alined hubs, a plurality of sections having hollow cylindrical threaded inner portions radially arranged and screw-engaging in the said central body, having straight guide-bearings therethrough, and provided with widened circularly-flanged portions, diaphragm-cases bolted to said widened flanged portions and marginally-clamping flexible diaphragms therebetween, said casings having valved air-inlet and air-outlet passages, a reservoir and conduits connecting the same with the several air-outlet passages, rods connected with the diaphragms and guided for rectilinear movements through said straight guide-bearings, pitman-rods connecting the diaphragm-rods, and the crank, a gear-wheel provided on one end of the crank-shaft, a short countershaft journaled through one of the aforesaid circular end sections, and having at its one end a pinion in mesh with said crank-shaft gear-wheel, and having at its other end a driving-wheel.

7. In an air-compressing machine, in combination, a central body or support having a plurality of axially-radial casings therearound, having air-inlet and valved air-outlet openings thereto and therefrom, with widened or chambered portions in each of which a circular skeleton frame is fitted having internal valve-limiting projections, the valves comprising stems guided in the smaller portions of the passages and heads in the larger chambered portions thereof and arranged to be limited in their opening movements by said projections, a reservoir, and conduits connecting the same with the air-outlets, flexible diaphragms in said cases, and rods connected respectively thereto, having guide-bearings for rectilinear movements through bearings therefor which are supported by the central body, a driving-shaft having a crank mounted for rotation in the central body, pitman-rods severally connecting with the crank and with the respective diaphragm-rods, and means for rotating the said shaft.

8. In an air-compressing machine, in combination, a central body or support having a plurality of axially-radial casings therearound, each having its outer circular wall of flaring form, and having valved air-inlet openings and valved air-outlet openings provided with screw-threaded orifices, a reservoir, and rigid conduits connected therewith and having end flanges entered with the threaded orifices of the said outlet-openings, annular coupling-nuts engaging the end flanges of said conduits, and screwing into said threaded orifices, said conduits constituting the supports for the reservoir, flexible diaphragms in said cases, and rods connected respectively thereto, having guide-bearings for rectilinear movements through bearings therefor which are supported by the central body, and carrying, next to the flexible diaphragms, rigid flaring diaphragm-followers, a driving-shaft, having a crank, mounted for rotation in the central body, pitman-rods severally connecting with the crank and with the respective diaphragm-rods, and means for rotating the said shaft.

9. In an air-compressing machine, the axially radially arranged diaphragm-cases having one wall of the chamber in each constituted by a flexible diaphram, and having inlet and outlet openings, the latter being connected with a reservoir and said openings having chambers therein with adjoining valve-seat openings, valves comprising heads and stems, devices in said openings, each constituted by a thin metal annular plate having external and internal prongs, bent on circular lines between the prongs constituting an outer cylindrical cage or frame for the accommodation of the valve-head and internal abutments to limit the play of the valve-heads, a crank-shaft, diaphragm-rods, and pitmen connecting the crank and said diaphragm-rods.

Signed by me at Boston, Massachusetts, in presence of two subscribing witnesses.

CLARENCE H. RICHWOOD.

Witnesses:
BERNARD PARK,
HENRY I. GOLDSMITH.